No. 653,896. Patented July 17, 1900.
R. BARNES.
REIN HOLDER.
(Application filed Mar. 12, 1900.)
(No Model.)
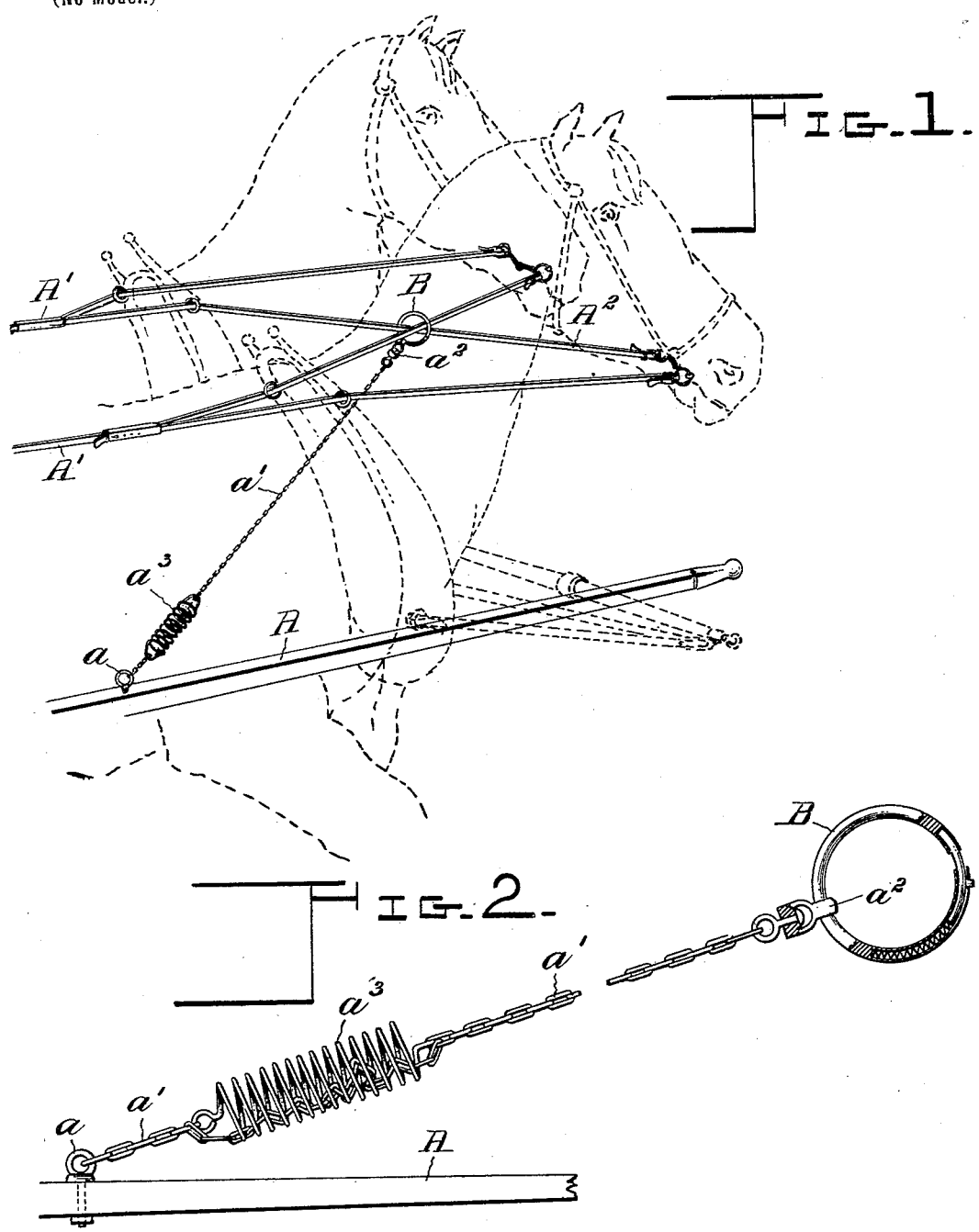
Witnesses:
John F. Dufferwiel
J. Ed. Page.
Richard Barnes, Inventor
By Marion & Marion
Attorneys

UNITED STATES PATENT OFFICE.

RICHARD BARNES, OF LAUDER, CANADA.

REIN-HOLDER.

SPECIFICATION forming part of Letters Patent No. 653,896, dated July 17, 1900.

Application filed March 12, 1900. Serial No. 8,248. (No model.)

*To all whom it may concern:*

Be it known that I, RICHARD BARNES, a subject of Her Majesty the Queen of Great Britain, residing at Lauder, county of Turtle Mountain, Province of Manitoba, Canada, have invented certain new and useful Improvements in Rein-Holders; and I do hereby declare that the following is a full, clear, and exact description of the invention, such as will enable others skilled in the art to which it appertains to make and use the same.

This invention relates to a rein-holder, and has for one of its objects to provide a device to be attached to the wagon-pole which will prevent the reins from getting caught under the end of the pole and which will prevent the horses from running away, should the harness break, by the strain on the bits.

A further object is to provide a rein-holder which will yield slightly under strain.

A further object is to provide a rein-holder which is simple in construction, effective and reliable in operation, and which may be manufactured at a moderate cost.

To these ends this invention consists in a rein-holder constructed substantially as hereinafter illustrated and described, and defined in the appended claim.

Referring to the drawings, in which similar letters of reference indicate similar parts, Figure 1 is a view in perspective of a rein-holder constructed in accordance with this invention, showing its operative position with respect to the reins. Fig. 2 is an enlarged view in elevation of the same.

In the drawings, A represents the pole of a wagon, and A' the usual reins, having the usual cross-lines $A^2$.

Attached to a suitable connection $a$ on the pole A is the chain $a'$, to the outer end of which is swiveled a suitable snap-hook $a^2$. A coiled spring $a^3$ is mounted on the chain at any suitable point, each end of the spring being attached to a link of the chain in such a manner as to leave sufficient slack chain within the coil of the spring to permit the spring to stretch to its fullest extent. The spring yields to excessive strain, permitting the free movement of the horses' heads and a slight forward movement of either horse. The length of the chain is of course so regulated that the portion of the cross-reins behind the ring B cannot pass beyond the end of the pole. Thus there is no possibility of the cross-reins getting caught under the end of the pole when the reins are slack.

The snap-hook $a^2$ is connected to a suitable snap-ring, through which the cross-reins are intended to pass, the ring being located at the point at which the reins cross. By means of this arrangement it will be apparent that any unusual forward movement of the horses will cause the ring to slip backwardly on the cross-reins, exerting a strain thereon which will tend to draw the heads of the horses together. Should a tug break, the draft strain would be instantly thrown upon the chain, violently drawing the heads of the horses together and exerting excessive strain on the bits, thus stopping the horses at once and rendering it impossible for them to run away so long as the chain remains unbroken.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

The combination with a pole, and the cross-lines of the driving-reins, of a chain connected loosely at one end to the pole and having a snap-hook at its other end, an extensible spring attached at its respective ends to two of the chain-links and normally tending to shorten the chain by forming a permanent allowance of slack within said spring, and a divided ring loosely engaged with the snap-hook and fitted loosely on the cross-lines at the point of intersection thereof, said spring tending normally to draw the chain, ring and cross-lines in a backward direction and also permitting the crossed lines to have a limited forward movement within the extensible capacity of the spring, substantially as described.

In witness whereof I have hereunto set my hand in the presence of two witnesses.

RICHARD BARNES.

Witnesses:
 ALEX MCINTOSH,
 H. H. BARNES.